(12) United States Patent
Guo et al.

(10) Patent No.: US 10,194,142 B2
(45) Date of Patent: Jan. 29, 2019

(54) DISPLAY DRIVING APPARATUS AND METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 310 days.

(21) Appl. No.: 15/023,268

(22) PCT Filed: Oct. 28, 2015

(86) PCT No.: PCT/CN2015/093080
§ 371 (c)(1),
(2) Date: Mar. 18, 2016

(87) PCT Pub. No.: WO2016/179971
PCT Pub. Date: Nov. 17, 2016

(65) Prior Publication Data
US 2017/0163974 A1    Jun. 8, 2017

(30) Foreign Application Priority Data

May 12, 2015   (CN) .......................... 2015 1 0239775

(51) Int. Cl.
*H04N 13/305*    (2018.01)
*G02B 27/22*     (2018.01)
(Continued)

(52) U.S. Cl.
CPC .......... *H04N 13/305* (2018.05); *G02B 27/22* (2013.01); *G09G 3/20* (2013.01); *H04N 13/31* (2018.05);
(Continued)

(58) Field of Classification Search
CPC ........... H04N 13/0404; H04N 13/0422; H04N 13/0447; H04N 13/0497; H04N 2213/001
See application file for complete search history.

(56) References Cited

U.S. PATENT DOCUMENTS 5,751,479 A * 5/1998 Hamagishi ......... G02B 27/2214
                                              348/E13.03
6,020,941 A * 2/2000 Ma ......................... G02B 27/26
                                              348/E13.022
(Continued)

FOREIGN PATENT DOCUMENTS

CN    101164097 A    4/2008
CN    101487938 A    7/2009
(Continued)

OTHER PUBLICATIONS

Office Action from corresponding Chinese application No. 201510239775.9, dated Jun. 13, 2017, 11 pages.
(Continued)

*Primary Examiner* — Peter D Le
(74) *Attorney, Agent, or Firm* — Harness, Dickey & Pierce, P.L.C.

(57) ABSTRACT

Embodiments of the present invention provide a display driving apparatus and method for a pixel array, the apparatus for pixel display of pixel units of a display device, which comprises a pixel array including a first view pixel unit and a second view pixel unit alternately arranged in the row direction, said pixel array includes in each row sub-pixels corresponding to one color, each of the first and second view
(Continued)

pixel units comprises a plurality of physical pixel units cyclically arranged in the column direction, and each physical pixel unit includes a plurality of sub-pixels, the apparatus comprising: an obtaining unit for obtaining an input signal of each sub-pixel in the first and second view pixel units; a setting unit for setting a sampling region on the pixel array for each sub-pixel in the first and second view pixel units; and a calculating unit for determining an output signal of each sub-pixel based on the sampling region of each sub-pixel, the physical pixel unit overlapping the sampling region and belonging to the same view pixel unit as the sub-pixel, and the input signal of each sub-pixel.

16 Claims, 9 Drawing Sheets

(51) Int. Cl.
  G09G 3/20    (2006.01)
  H04N 13/324  (2018.01)
  H04N 13/351  (2018.01)
  H04N 13/398  (2018.01)
  H04N 13/31   (2018.01)
  G09G 3/00    (2006.01)
(52) U.S. Cl.
  CPC ......... H04N 13/324 (2018.05); H04N 13/351 (2018.05); H04N 13/398 (2018.05); G09G 3/003 (2013.01); G09G 2300/0452 (2013.01); H04N 2213/001 (2013.01)

(56) References Cited

U.S. PATENT DOCUMENTS

| | | | | |
|---|---|---|---|---|
| 2002/0005848 | A1* | 1/2002 | Asai | H04N 13/026 345/419 |
| 2002/0113866 | A1* | 8/2002 | Taniguchi | G02B 27/2214 348/51 |
| 2004/0150583 | A1* | 8/2004 | Fukushima | G02B 27/2214 345/6 |
| 2007/0291054 | A1* | 12/2007 | Shin | G09G 3/003 345/694 |
| 2008/0030660 | A1* | 2/2008 | Roth | G09G 3/3607 349/106 |
| 2012/0033056 | A1* | 2/2012 | Yamauchi | G02B 27/2214 348/51 |
| 2012/0086708 | A1* | 4/2012 | Lin | G09G 3/003 345/419 |
| 2012/0274890 | A1* | 11/2012 | Uehara | H04N 13/0409 349/144 |
| 2013/0147852 | A1* | 6/2013 | Hsieh | H04N 13/0409 345/690 |
| 2014/0015864 | A1 | 1/2014 | Kim | |
| 2014/0098205 | A1* | 4/2014 | Usukura | H04N 13/0409 348/59 |
| 2014/0368554 | A1* | 12/2014 | Asano | G06T 9/00 345/690 |
| 2016/0275844 | A1 | 9/2016 | Guo et al. | |
| 2016/0379533 | A1 | 12/2016 | Guo et al. | |
| 2016/0379540 | A1 | 12/2016 | Guo et al. | |

FOREIGN PATENT DOCUMENTS

| | | |
|---|---|---|
| CN | 103703411 A | 4/2014 |
| CN | 104299561 | 1/2015 |
| CN | 104599625 | 5/2015 |
| CN | 104599626 | 5/2015 |
| CN | 104680966 A | 6/2015 |
| CN | 104793341 | 7/2015 |
| EP | 2639785 A2 | 9/2013 |
| EP | 3273433 A1 | 1/2018 |
| WO | WO-2008100826 A1 | 8/2008 |

OTHER PUBLICATIONS

Office Action from corresponding Chinese Application No. 201510239775.9, dated Oct. 18, 2016 (9 pages).

Written Opinion of the International Searching Authority from corresponding PCT Application No. PCT/CN2015/093080, dated Jan. 25, 2016. (5 pages)

Extended European Search Report from European Application No. 15839094.8 dated Sep. 14, 2018 (11).

* cited by examiner

|    | S1  | S2  | S3  | S4  | S5  | S6  | S7  | S8  |
|----|-----|-----|-----|-----|-----|-----|-----|-----|
| R1 | B 1 | B 2 | B 1 | B 2 | B 1 | B 2 | B 1 | B 2 |
| R2 | G 1 | G 2 | G 1 | G 2 | G 1 | G 2 | G 1 | G 2 |
| R3 | R 1 | R 2 | R 1 | R 2 | R 1 | R 2 | R 1 | R 2 |
| R4 | B 1 | B 2 | B 1 | B 2 | B 1 | B 2 | B 1 | B 2 |
| R5 | G 1 | G 2 | G 1 | G 2 | G 1 | G 2 | G 1 | G 2 |
| R6 | R 1 | R 2 | R 1 | R 2 | R 1 | R 2 | R 1 | R 2 |
| R7 | B 1 | B 2 | B 1 | B 2 | B 1 | B 2 | B 1 | B 2 |
| R8 | G 1 | G 2 | G 1 | G 2 | G 1 | G 2 | G 1 | G 2 |
| R9 | R 1 | R 2 | R 1 | R 2 | R 1 | R 2 | R 1 | R 2 |
| R10 | B 1 | B 2 | B 1 | B 2 | B 1 | B 2 | B 1 | B 2 |
| R11 | G 1 | G 2 | G 1 | G 2 | G 1 | G 2 | G 1 | G 2 |
| R12 | R 1 | R 2 | R 1 | R 2 | R 1 | R 2 | R 1 | R 2 |
| R13 | B 1 | B 2 | B 1 | B 2 | B 1 | B 2 | B 1 | B 2 |
| R14 | G 1 | G 2 | G 1 | G 2 | G 1 | G 2 | G 1 | G 2 |
| R15 | R 1 | R 2 | R 1 | R 2 | R 1 | R 2 | R 1 | R 2 |
| R16 | B 1 | B 2 | B 1 | B 2 | B 1 | B 2 | B 1 | B 2 |
| R17 | G 1 | G 2 | G 1 | G 2 | G 1 | G 2 | G 1 | G 2 |
| R18 | R 1 | R 2 | R 1 | R 2 | R 1 | R 2 | R 1 | R 2 |

DISPLAY DRIVING APPARATUS AND METHOD

CROSS-REFERENCE TO RELATED APPLICATION

The present application claims priority to Chinese Patent Application No. 201510239775.9 filed on May 12, 2015, all of which are hereby incorporated by reference in their entirety as a part of the present application.

TECHNICAL FIELD

The exemplary embodiments of the present invention relate to a display driving apparatus and method.

BACKGROUND

The naked-eye three dimensional (3D) technology, which is commonly found in large-size TVs, enables people to feel 3D visual effects through differentiating information input into people's left and right eyes using an optical grating. Each of the pixels in the 3D display device consists of multiple sub-pixels which are mixed to display color, for example, each pixel consists of a red sub-pixel, a green sub-pixel and a blue sub-pixel. With the continuous development of the display technology, the demand for display devices with high resolution is becoming increasingly high in order to provide the users with improved and enhanced visual effects.

Unfortunately, due to the light-blocking grating design adopted by the naked-eye 3D display technology, the number of pixels per inch (PPI) achieved during watching is significantly reduced and sometimes may even be reduced by 50%, resulting in reduced 3D effects. In general, the resolution of 3D display device may be improved by reducing the size of sub-pixels. However, it is impossible to infinitely reduce the size of the sub-pixels due to technical limitations. It has become a focus in the current technology development as to how to improve the resolution of the 3D display device under the circumstances that the size of the sub-pixels is fixed.

SUMMARY

The display driving method and apparatus according to the embodiments of the present invention are capable of increasing the resolution of the display device and enhancing its display effects without increasing the size of the pixels.

According to the first aspect of the present invention, it provides a display driving method for pixel display of pixel units of a display device, which comprises a pixel array including a first view pixel unit and a second view pixel unit alternately arranged in the row direction, said pixel array includes in each row sub-pixels corresponding to one color, each of the first and second view pixel units comprises a plurality of physical pixel units cyclically arranged in the column direction, and each physical pixel unit includes a plurality of sub-pixels, the method comprising:

obtaining an input signal of each sub-pixel in each physical pixel unit of the first and second view pixel units;

setting a sampling region on the pixel array for each sub-pixel in the first and second view pixel units; and determining an output signal of each sub-pixel based on the sampling region of each sub-pixel, the physical pixel unit overlapping the sampling region and belonging to the same view pixel unit as the sub-pixel, and the input signal of each sub-pixel.

According to one embodiment of the invention, the display device further comprises a grating array, which blocks a first side of the first view pixel unit and a second side of the second view pixel unit, wherein the positions of the first side and the second side in the view pixel unit are opposite.

According to one embodiment of the invention, setting the sampling region on the pixel array for each sub-pixel in the first and second view pixel units comprises:

setting the sampling region on the pixel array for each sub-pixel of the physical pixel units, which are located on boundaries of the pixel array, of the first and second view pixel units.

According to one embodiment of the invention, determining the output signal of each sub-pixel based on the sampling region of each sub-pixel, the physical pixel unit overlapping the sampling region and belonging to the same view pixel unit as the sub-pixel, and the input signal of each sub-pixel comprises:

in the pixel array of the display device, obtaining the physical pixel unit overlapping the sampling region and belonging to the same view pixel unit as the sub-pixel;

calculating the proportion of each physical pixel unit overlapping the sampling region and belonging to the same view pixel unit as the sub-pixel to the sampling region; and calculating to obtain the output signal of each sub-pixel based on the input signal of the sub-pixel and the proportion of each physical pixel unit overlapping the sampling region and belonging to the same view pixel unit as the sub-pixel to the sampling region.

According to one embodiment of the invention, calculating the proportion of each physical pixel unit overlapping the sampling region and belonging to the same view pixel unit as the sub-pixel to the sampling region comprises:

obtaining the area of the sampling region;

calculating overlapping area between each physical pixel unit overlapping the sampling region and belonging to the same view pixel unit as the sub-pixel and the sampling region; and calculating the proportion of each physical pixel unit overlapping the sampling region and belonging to the same view pixel unit as the sub-pixel to the sampling region based on the proportion of the overlapping area between each physical pixel unit overlapping the sampling region and belonging to the same view pixel unit as the sub-pixel and the sampling region to the total area of the sampling region.

According to one embodiment of the invention, calculating to obtain the output signal of each sub-pixel based on the input signal of the sub-pixel and the proportion of each physical pixel unit overlapping the sampling region and belonging to the same view pixel unit as the sub-pixel to the sampling region comprises:

obtaining the value of an input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region; and calculating the value of the output signal of each sub-pixel based on the value of the input signal of each sub-pixel, which corresponds to the sampling region, of each physical pixel unit overlapping the sampling region and belonging to the same view pixel unit as the sub-pixel.

According to one embodiment of the invention, in the sampling region corresponding to any of the sub-pixels, the boundaries of the sampling region of said sub-pixel on the side of an adjacent sub-pixel of the same kind are on an axis vertically and equally dividing a line connecting the center of said sub-pixel and the center of the adjacent sub-pixel of the same kind;

Other boundaries of the sampling region are boundaries of pixel region of the display device; and The sub-pixel of the same kind refers to a sub-pixel which belongs to the same kind of view pixel unit and has the same color as the sub-pixel.

According to one embodiment of the invention, the sampling region has a rectangular shape.

According to the second aspect of the present invention, it provides a display driving apparatus for pixel display of pixel units of a display device, which comprises a pixel array including a first view pixel unit and a second view pixel unit alternately arranged in the row direction, said pixel array includes in each row sub-pixels corresponding to one color, each of the first and second view pixel units comprises a plurality of physical pixel units cyclically arranged in the column direction, and each physical pixel unit includes a plurality of sub-pixels, the apparatus comprising:

an obtaining unit for obtaining an input signal of each sub-pixel in the first and second view pixel units;

a setting unit for setting a sampling region on the pixel array for each sub-pixel in the first and second view pixel units; and a calculating unit for determining an output signal of each sub-pixel based on the sampling region of each sub-pixel, the physical pixel unit overlapping the sampling region and belonging to the same view pixel unit as the sub-pixel, and the input signal of each sub-pixel.

According to one embodiment of the invention, the display device further comprises a grating array, which blocks a first side of the first view pixel unit and a second side of the second view pixel unit, wherein the positions of the first side and the second side in the view pixel unit are opposite.

According to one embodiment of the invention, the setting unit being used for setting the sampling region on the pixel array for each sub-pixel in the first and second view pixel units comprises:

setting the sampling region on the pixel array for each sub-pixel of the physical pixel units, which are located on boundaries of the pixel array, of the first and second view pixel units.

According to one embodiment of the invention, the calculating unit comprises:

an obtaining module for obtaining, in the pixel array of the display device, a physical pixel unit overlapping the sampling region and belonging to the same view pixel unit as the sub-pixel;

a calculating module for calculating the proportion of each physical pixel unit overlapping the sampling region and belonging to the same view pixel unit as the sub-pixel to the sampling region; and a processing module for obtaining the output signal of each sub-pixel based on the input signal of the sub-pixel and the proportion of each physical pixel unit overlapping the sampling region and belonging to the same view pixel unit as the sub-pixel to the sampling region.

According to one embodiment of the invention, the calculating module comprises:

an obtaining sub-module for obtaining the area of the sampling region; and a calculating sub-module for calculating overlapping area between each physical pixel unit overlapping the sampling region and belonging to the same view pixel unit as the sub-pixel and the sampling region;

wherein the calculating sub-module is further used for calculating the proportion of each physical pixel unit overlapping the sampling region and belonging to the same view pixel unit as the sub-pixel to the sampling region based on the proportion of the overlapping area between each physical pixel unit overlapping the sampling region and belonging to the same view pixel unit as the sub-pixel and the sampling region to the area of the sampling region.

According to one embodiment of the invention, the processing module is used for:

obtaining the value of an input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region; and calculating the value of the output signal of each sub-pixel based on the value of the input signal of each sub-pixel, which corresponds to the sampling region, of each physical pixel unit overlapping the sampling region and belonging to the same view pixel unit as the sub-pixel.

According to one embodiment of the invention, in the sampling region corresponding to any of the sub-pixels, the boundaries of said sampling region of the sub-pixel on the side of an adjacent sub-pixel of the same kind is on an axis vertically and equally dividing a line connecting the center of said sub-pixel and the center of the adjacent sub-pixel of the same kind;

Other boundaries of the sampling region are boundaries of pixel region of the display device; and The sub-pixel of the same kind refers to a sub-pixel which belongs to the same kind of view pixel unit and has the same color as the sub-pixel.

According to one embodiment of the invention, the sampling region has a rectangular shape.

BRIEF DESCRIPTION OF THE DRAWINGS

To make the technical solution of the embodiments of the present invention or the prior art clearer, the accompanying drawings for illustrating the embodiments of the present invention or the prior art are outlined below. Obviously, the accompanying drawings are exemplary only, and those skilled in the art can derive other drawings from such accompanying drawings without creative efforts.

FIG. 1 is a schematic view illustrating the pixel arrangement of pixel units of a display device according to an embodiment of the present invention;

FIG. 9 is a schematic view illustrating all boundary sampling regions of the red sub-pixels of the first view pixel unit in the boundary pixel region of the pixel units of the display device according to an embodiment of the present invention;

FIG. 10 is a schematic view illustrating all boundary sampling regions of the blue sub-pixels of the first view pixel unit in the boundary pixel region of the pixel units of the display device according to an embodiment of the present invention;

DETAILED DESCRIPTION

With reference to the accompanying drawings, the technical solution of the embodiments of the present invention will be described clearly and completely as following. Obviously, the embodiments described are merely part instead of all of embodiments of the present invention. Based on the embodiments of the present invention, all other embodiments obtained by those of ordinary skill in the art without creative efforts fall within the scope of protection of the present invention.

It is to be understood that the terms such as "left", "right", "top", "bottom" used herein are only used to simplify description of the present invention, and do not indicate or imply that the device or element referred to must have or operated in a particular orientation, all of which cannot be seen as limits to the present invention.

Furthermore, throughout the description of the present invention, the phrase "a plurality of" means two or more unless otherwise defined.

Figures 2, 3:
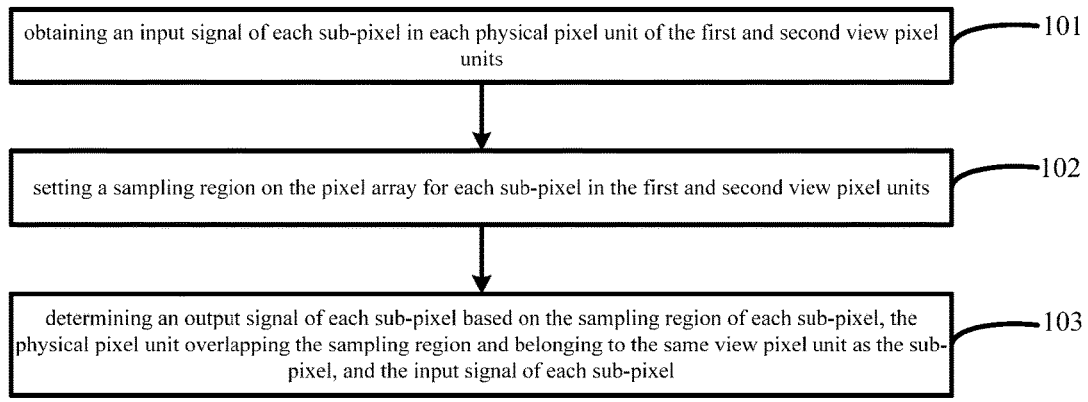
FIG. 2 is a schematic view illustrating the arrangement of grating array and pixel array in the pixel arrangement of pixel units of a display device according to an embodiment of the present invention.
FIG. 3 is a flow chart illustrating a display driving method according to an embodiment of the present invention.

As shown in FIGS. 1-2, an embodiment of the present invention provides a display driving method for pixel display of pixel units of a display device, and the display device comprises a pixel array 10 and a grating array 11, wherein the pixel array 10 includes a first view pixel unit 12 and a second view pixel unit 13 alternately arranged in the row direction, and said pixel array 10 includes in each row sub-pixels corresponding to one color, while a grating array 11 blocks a first side of the first view pixel unit 12 and a second side of the second view pixel unit 13 adjacent to the first view pixel unit 12, wherein the positions of the first side and the second side in the view pixel unit are opposite, wherein each of the first and second view pixel units comprises a plurality of physical pixel units cyclically arranged in the column direction, and each physical pixel unit includes a plurality of sub-pixels.

It should be understood that, the positions of the first side of the first view pixel unit and the second side of the second view pixel unit being opposite may be interpreted as follows: if the first side of the first view pixel unit is the left side of the first view pixel unit, then the second side of the second view pixel unit is the right side of the second view pixel unit; alternatively, if the first side of the first view pixel unit is the right side of the first view pixel unit, then the second side of the second view pixel unit is the left side of the second view pixel unit. In other words, the positional relationship between the first and second sides is opposite and shall not be exclusively determined.

As shown in FIG. 3, the method comprises steps 101, 102 and 103, which will be discussed in details hereunder.

In step 101, obtaining an input signal of each sub-pixel in each physical pixel unit of the first and second view pixel units.

Said physical pixel unit comprises sub-pixels, the number of colors of which is the same as that of the pixel units of the display device. In this embodiment, as an example, the physical pixel unit comprises sub-pixels of three colors including red, green and blue. It is possible to obtain an input signal of each of the sub-pixels in each physical pixel unit through obtaining the input signal of each of the red, green and blue sub-pixels from the input signals.

In step 102, setting a sampling region on the pixel array for each sub-pixel in the first and second view pixel units.

In step 102, setting the sampling region on the pixel array for each sub-pixel of the physical pixel units of the first and second view pixel units may be achieved as follow:

Setting the sampling region on the pixel array for each sub-pixel of the physical pixel units, which are located on boundary regions of the pixel array, of the first and second view pixel units.

In particular, the boundary regions of pixel array for the physical pixel units of the first and second view pixel units may refer to the regions where the physical pixel units, which neighbor on the boundaries of the pixel region of the display device, of the first and second view pixel units_are located.

In step 103, determining an output signal of each sub-pixel based on the sampling region of each sub-pixel, the physical pixel unit overlapping the sampling region and belonging to the same view pixel unit as the sub-pixel, and the input signal of each sub-pixel.

In this embodiment, as an example, each of the physical pixel units in the first and second view pixel units comprises sub-pixels of three different colors, that is, red, green and blue.

The display driving method for the pixel array according to the embodiment of the present invention comprises: firstly, obtaining the input signal of each sub-pixel in each physical pixel unit of the first and second view pixel units, then setting a sampling region on the pixel array for each sub-pixel in the first and second view pixel units, and finally determining an output signal of each sub-pixel based on the sampling region of each sub-pixel, the physical pixel unit overlapping the sampling region and belonging to the same view pixel unit as the sub-pixel, and the input signal of each sub-pixel. In this way, the output signal of each sub-pixel is determined by the input signals of all sub-pixels corresponding to the physical pixel units that are overlapped by the sampling region of the current sub-pixel and belong to the same view pixel unit as the sub-pixel. The exemplary embodiment of the present invention is capable of enhancing the resolution of the pixels in terms of visual effects, and enhancing resolution and improving display effects of the display device without increasing the size of the pixels. Meanwhile, the exemplary embodiment of the present invention is capable of combing the 3D display technology with the virtual algorithm in a better way to improve display effects of the display device.

Figure 4:
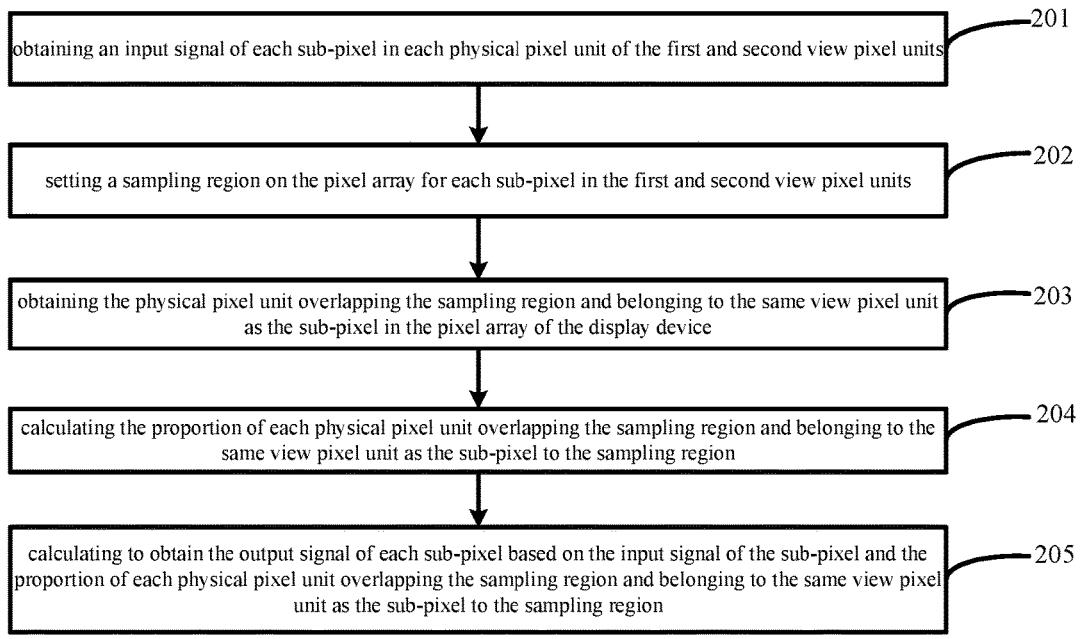
FIG. 4 is a flow chart illustrating a display driving method according to another embodiment of the present invention.

An embodiment of the present invention provides another display driving method that can be used for pixel display of the pixel units of the display device shown in FIGS. 1-2. As shown in FIG. 4, the method comprises steps 201 to 205, which will be discussed in details hereunder.

In step 201, obtaining an input signal of each sub-pixel in each physical pixel unit of the first and second view pixel units.

In step 202, setting a sampling region on the pixel array for each sub-pixel in the first and second view pixel units.

In the sampling region corresponding to any of the sub-pixels, the boundaries of the sampling region of said sub-pixel on the side of an adjacent sub-pixel of the same kind is on an axis vertically and equally dividing a line connecting the center of said sub-pixel and the center of the adjacent sub-pixel of the same kind. Other boundaries of the sampling region are boundaries of pixel region of the display device.

The sub-pixel of the same kind refers to a sub-pixel which belongs to the same kind of view pixel unit and has the same color as the current sub-pixel.

Figure 5:
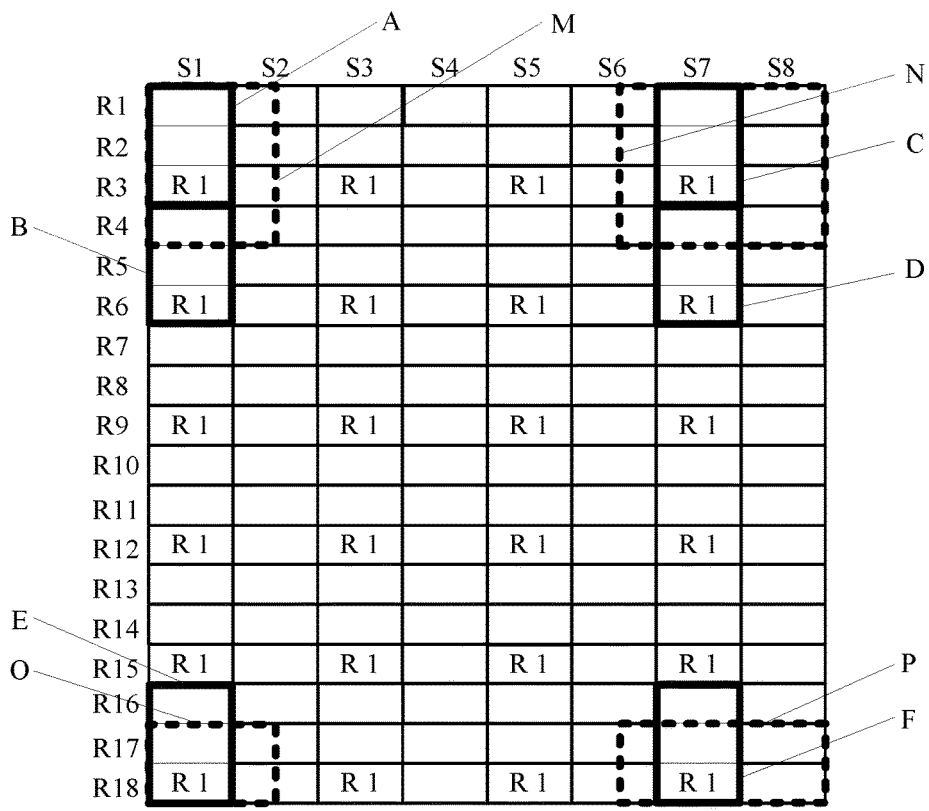
FIG. 5 is a schematic view illustrating corner sampling regions of red sub-pixels of the first view pixel unit in the boundary pixel region of the pixel units of the display device according to an embodiment of the present invention.

In particular, as shown in FIG. 5, the sampling for a red sub-pixel R1 in the first view pixel unit of the pixel array_will be illustrated. FIG. 5 is a schematic view illustrating sampling of four corner regions for the red sub-pixel R1. With respect to the top left corner sampling region M, i.e., the sampling region M of the red sub-pixel R1 in R3 row and S1 column, its left boundary and top boundary are the left boundary and top boundary of the pixel region of the display device, respectively, its right boundary is on an axis vertically and equally dividing a line connecting the center of an adjacent red sub-pixel R1 (i.e., red sub-pixel R1 in R3 row and S3 column) in the first view pixel unit and the center of the red sub-pixel R1 in R3 row and S1 column, and its bottom boundary is on an axis vertically and equally dividing a line connecting the center of an adjacent red sub-pixel R1 in R6 row and S1 column and the center of the red sub-pixel R1 in R3 row and S1 column. In this case and with the area of one sub-pixel taken as a unit area, the area of the sampling region M for the sub-pixel R1 in R3 row and S1 column is six times of the unit area. The physical pixel units overlapped by the sampling region M (e.g., the top left corner region shown in dotted lines) include a physical pixel unit A and a physical pixel unit B. The overlapping area between the physical pixel unit A and the sampling region M is three times of the unit area, and the overlapping area between the physical pixel unit B and the sampling region M is one unit area. Therefore, the value of the output signal of the red sub-pixel R1 in R3 row and S1 column is obtained by weighted calculation of 3/6 (i.e., 1/2) of the value of the input signal of the red sub-pixel R1 in R3 row and S1 column and 1/6 of the value of the input signal of the red sub-pixel R1 in R6 row and S1 column.

Similarly, as shown in FIG. 5, with respect to the top right corner sampling region N, i.e., the sampling region N of the red sub-pixel R1 in R3 row and S7 column, its left boundary is on an axis vertically and equally dividing a line connecting the center of an adjacent red sub-pixel R1 in R3 row and S5 column and the center of the red sub-pixel R1 in R3 row and S7 column, its bottom boundary is on an axis vertically and equally dividing a line connecting the center of an adjacent red sub-pixel R1 in R6 row and S7 column and the center of the red sub-pixel R1 in R3 row and S7 column, and its right and top boundaries are the right and top boundaries of the pixel region of the display device, respectively. In this case, the area of the sampling region N is ten times of the unit area. The physical pixel units overlapped by the sampling region N include a physical pixel unit C and a physical pixel unit D. The overlapping area between the physical pixel unit C and the sampling region N is three times of the unit area, and the overlapping area between the physical pixel unit D and the sampling region N is one unit area. Therefore, the value of the output signal of the red sub-pixel R1 in R3 row and S7 column is obtained by weighted calculation of 3/10 of the value of the input signal of the red sub-pixel R1 in R3 row and S7 column and 1/10 of the value of the input signal of the red sub-pixel R1 in R6 row and S7 column.

Similarly, the determination of the sampling region O (i.e., the sampling region of the red sub-pixel R1 in R18 row and S1 column) can be made with reference to the determination of the sampling region M of the red sub-pixel R1 in R3 row and S1 column and is thus not described in details here. In this case, the area of the sampling region O is three times of the unit area. The physical pixel units overlapped by the sampling region O include a physical pixel unit E. The overlapping area between the physical pixel unit E and the sampling region O is two times of the unit area. Therefore, the value of the output signal of the red sub-pixel R1 in R18 row and S1 column is obtained by 2/3 of the value of the input signal of the red sub-pixel R1 in R18 row and S1 column. Similarly, the determination of the sampling region P (i.e., the sampling region of the red sub-pixel R1 in R18 row and S7 column) can be made with reference to the determination of the sampling region N of the red sub-pixel R1 in R3 row and S7 column and is thus not described in details here. In this case, the area of the sampling region P is five times of the unit area. The physical pixel units overlapped by the sampling region P include a physical pixel unit F. The overlapping area between the physical pixel unit F and the sampling region P is two times of the unit area. Therefore, the value of the output signal of the red sub-pixel R1 in R18 row and S7 column is obtained by 2/5 of the value of the input signal of the red sub-pixel R1 in R18 row and S7 column.

Additionally, in this embodiment, the gray-scale value corresponding to the value of the output signal of the sub-pixel in each pixel may be derived based on the gray-scale value corresponding to the value of the input signal of the sub-pixel in the corresponding pixel, or the brightness value corresponding to the value of the output signal of the sub-pixel in each pixel may be derived based on the brightness value corresponding to the value of the input signal of the sub-pixel in the corresponding pixel, whereby the output signal of the sub-pixel in each pixel can be obtained based on the input signal of the sub-pixel in the corresponding pixel.

In step 203, obtaining the physical pixel unit overlapping the sampling region and belonging to the same view pixel unit as the sub-pixel in the pixel array of the display device.

In step 204, calculating the proportion of each physical pixel unit overlapping the sampling region and belonging to the same view pixel unit as the sub-pixel to the sampling region.

Figure 6:
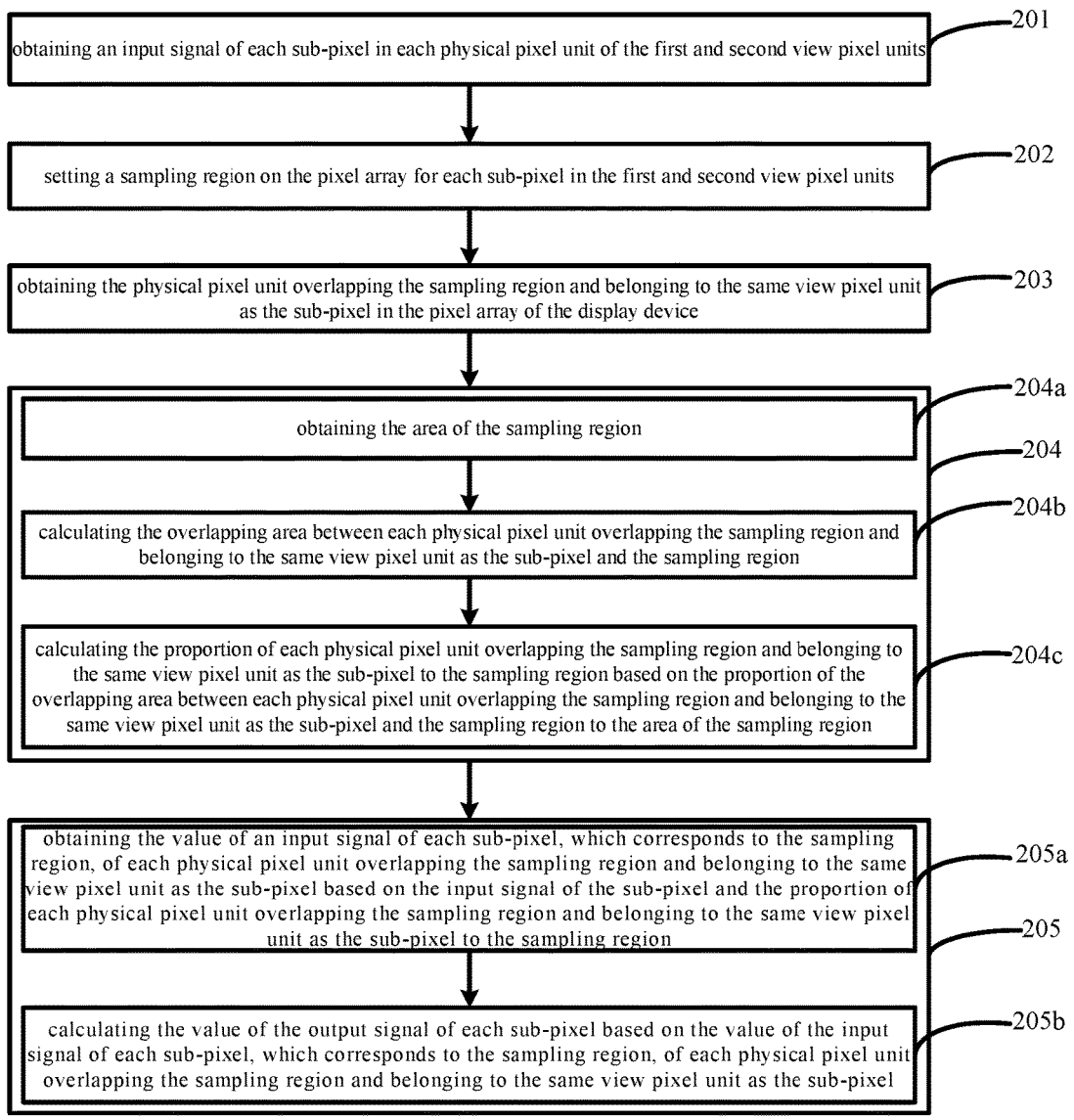
FIG. 6 is a flow chart illustrating a display driving method according to still another embodiment of the present invention.

In particular, as shown in FIG. 6, foresaid step 204 may be achieved by the following steps 204a to 204c, which will be discussed in details hereunder.

In step 204a, obtaining the area of the sampling region.

In step 204b, calculating the overlapping area between each physical pixel unit overlapping the sampling region and belonging to the same view pixel unit as the sub-pixel and the sampling region.

In step 204c, calculating the proportion of each physical pixel unit overlapping the sampling region and belonging to the same view pixel unit as the sub-pixel to the sampling region based on the proportion of the overlapping area between each physical pixel unit overlapping the sampling region and belonging to the same view pixel unit as the sub-pixel and the sampling region to the area of the sampling region.

In step 205, calculating to obtain the output signal of each sub-pixel based on the input signal of the sub-pixel and the proportion of each physical pixel unit overlapping the sampling region and belonging to the same view pixel unit as the sub-pixel to the sampling region.

In particular, as shown in FIG. 6, calculating to obtain the output signal of each sub-pixel based on the input signal of the sub-pixel and the proportion of each physical pixel unit overlapping the sampling region and belonging to the same view pixel unit as the sub-pixel to the sampling region in step 205 may be achieved by the following steps 205a to 205b, which will be discussed in details hereunder.

In step 205a, obtaining the value of an input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region.

In step 205b, calculating the value of the output signal of each sub-pixel based on the value of the input signal of each sub-pixel, which corresponds to the sampling region, of each physical pixel unit overlapping the sampling region and belonging to the same view pixel unit as the sub-pixel.

According to one embodiment of the invention, the sampling region has a rectangular shape.

Figure 7:
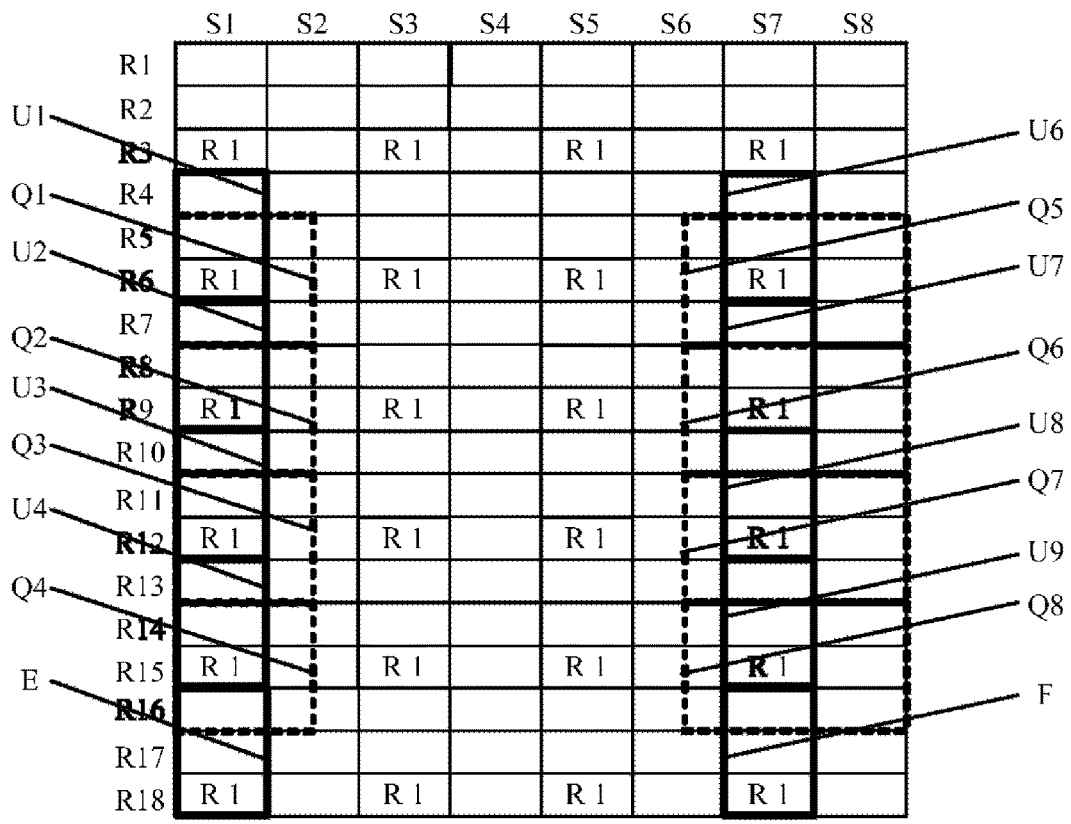
FIG. 7 is a schematic view illustrating the left and right sides middle boundary sampling regions of the red sub-pixels of the first view pixel unit in the boundary pixel region of the pixel units of the display device according to an embodiment of the present invention.

In particular, FIG. 7 is a schematic view illustrating the left and right sides middle boundary sampling regions of the red sub-pixels of the first view pixel unit in the boundary pixel region of the pixel units of the display device. The sampling regions include Q1, Q2, Q3, Q4, Q5, Q6, Q7 and Q8. The physical pixel units overlapped by the left side boundary sampling region Q1 include U1 and U2, the physical pixel units overlapped by the boundary sampling region Q2 include U2 and U3, the physical pixel units overlapped by the boundary sampling region Q3 include U3 and U4, the physical pixel units overlapped by the boundary sampling region Q3 include U4 and E. The physical pixel units overlapped by the right side boundary sampling region Q5 include U6 and U7, the physical pixel units overlapped by the boundary sampling region Q6 include U7 and U8, the physical pixel units overlapped by the boundary sampling region Q7 include U8 and U9, the physical pixel units overlapped by the boundary sampling region Q8 include U9 and F.

Figure 8:
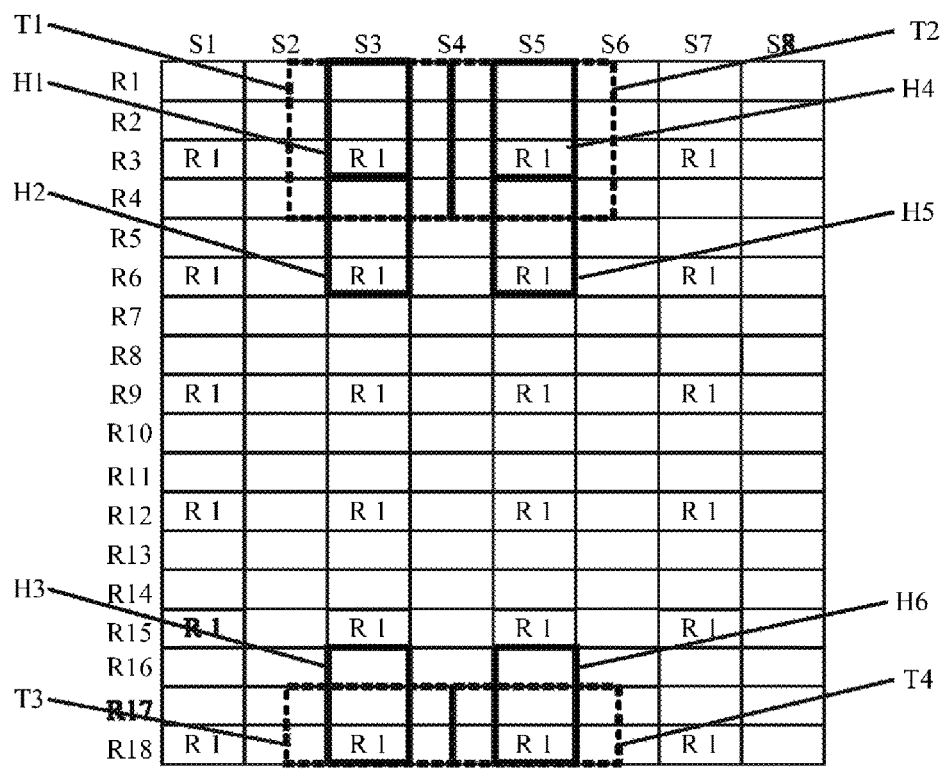
FIG. 8 is a schematic view illustrating the top and bottom sides middle boundary sampling regions of the red sub-pixels of the first view pixel unit in the boundary pixel region of the pixel units of the display device according to an embodiment of the present invention.

FIG. 8 is a schematic view illustrating the top and bottom sides middle boundary sampling regions of the red sub-pixels of the first view pixel unit in the boundary pixel region of the pixel units of the display device. The sampling regions include T1, T2, T3 and T4. The physical pixel units overlapped by the top side boundary sampling region T1 include H1 and H2, the physical pixel units overlapped by the boundary sampling region T2 include H4 and H5. The physical pixel units overlapped by the bottom boundary sampling region T3 include H3, and the physical pixel units overlapped by the boundary sampling region T4 include H6.

Figures 9, 10:
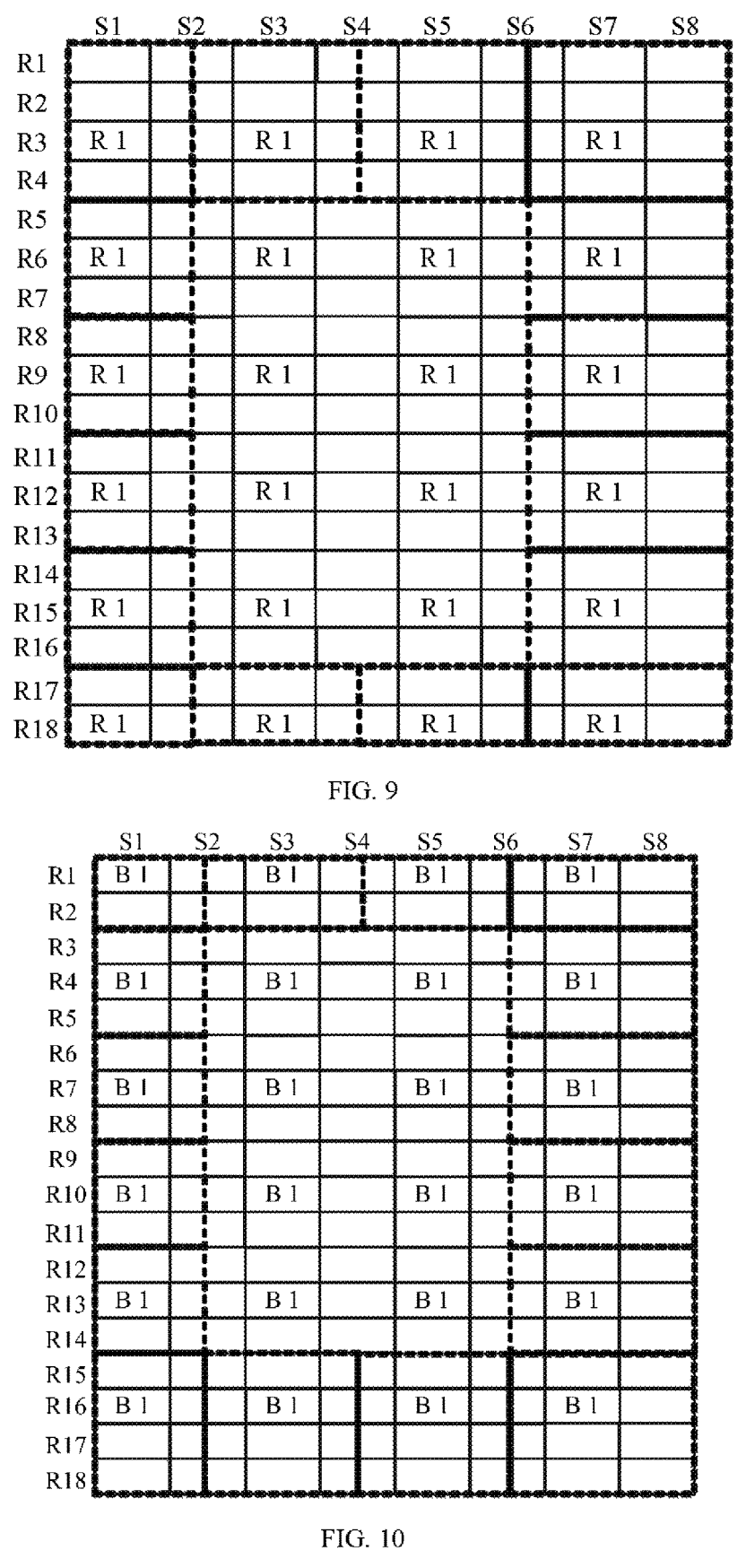
Figures 11, 12:
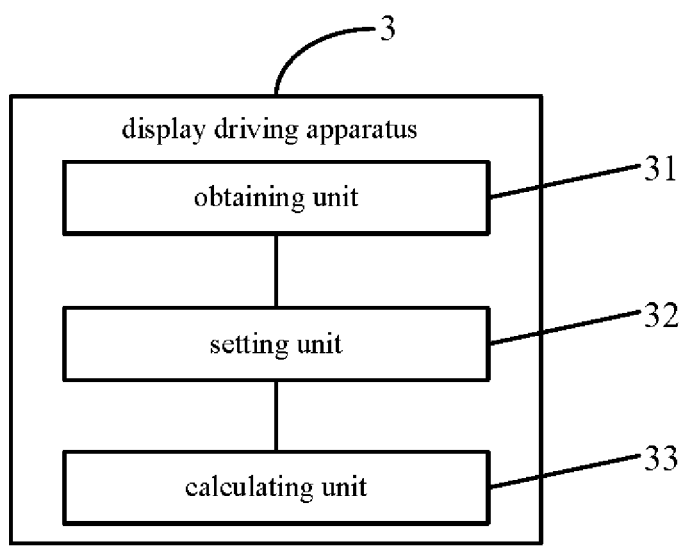
FIG. 11 is a schematic view illustrating all boundary sampling regions of the green sub-pixels of the first view pixel unit in the boundary pixel region of the pixel units of the display device according to an embodiment of the present invention.
FIG. 12 is a schematic view illustrating the structure of a display driving apparatus according to an embodiment of the present invention.

In particular, FIG. 9 is a schematic view illustrating sampling regions of the red sub-pixels R1 of the first view pixel unit in the boundary pixel region of the pixel units of the display device; FIG. 10 is a schematic view illustrating sampling regions of the blue sub-pixels B1 of the first view pixel unit in the boundary pixel region of the pixel units of the display device; and FIG. 11 is a schematic view illustrating sampling regions of the green sub-pixels G1 of the first view pixel unit in the boundary pixel region of the pixel units of the display device.

It should be understood that in principle the sampling regions of the blue sub-pixel B1 and the green sub-pixel G1 are determined in the way similar to that for determining the sampling regions of the red sub-pixel R1. In addition, the output signal of each blue sub-pixel B1 in the sampling region of the blue sub-pixel B1 and the output signal of each green sub-pixel G1 in the sampling region of the green sub-pixel G1 are calculated in the way similar to that for calculating the output signal of each red sub-pixel R1 in the sampling region of the red sub-pixel R1, and thus are not described in details here.

Of course, the sampling regions of each sub-pixel in the second view pixel unit in the pixel array may be determined in the way similar to that in the first view pixel unit, in addition, the output signal of each sub-pixel in the sampling region determined in the second view pixel unit may also be calculated in the way similar to that in the first view pixel unit, and thus are not described in details here.

In addition, each of the first and second view pixel units is formed of N sub-pixels having different colors and cyclically arranged in a column, wherein N is an integer equal to or greater than 3. In this embodiment, as an example, N is equal to 3 and sub-pixels with three colors including red, green and blue are used.

When N is equal to 3, the arrangement of the colors of the sub-pixels comprised in the pixel unit may be: red, green, blue; red, blue; green; green, red, blue; green, blue, red; blue, red, green; or blue, green, red. When N is equal to 4, the colors of the sub-pixels comprised in the pixel unit may include red, green, blue and white, and the sub-pixels may be arranged according to any of the combinations of these four colors in any order. Of course, the value of N may be other than 3 and 4 given by examples above and may be determined based on the particular structure of the pixel unit in the display device.

Note that the description of steps in this embodiment that are the same as those described in the foregoing embodiments may refer to the description made in any of these foregoing embodiments and is thus omitted here.

An embodiment of the present invention provides a display driving apparatus for pixel display of pixel units of the display device as shown in FIGS. 1 and 2. As can be seen in FIG. 12, the display driving apparatus comprises an obtaining unit 31, a setting unit 32 and a calculating unit 33, wherein the obtaining unit 31 is used for obtaining an input signal of each sub-pixel in the first and second view pixel units;

the setting unit 32 is used for setting a sampling region on the pixel array for each sub-pixel in the first and second view pixel units; and the calculating unit 33 is used for determining an output signal of each sub-pixel based on the sampling region of each sub-pixel, the physical pixel unit overlapping the sampling region and belonging to the same view pixel unit as the sub-pixel, and the input signal of each sub-pixel.

In particular, the setting unit 32 is used for setting the sampling region on the pixel array for each sub-pixel of the physical pixel units, which are located on boundary regions of the pixel array, of the first and second view pixel units.

The display driving apparatus according to the embodiment of the present invention firstly obtains an input signal of each sub-pixel in each physical pixel unit of the first and second view pixel units, then sets a sampling region on the pixel array for each sub-pixel in the first and second view pixel units, and finally determines an output signal of each sub-pixel based on the sampling region of each sub-pixel, the physical pixel unit overlapping the sampling region and belonging to the same view pixel unit as the sub-pixel, and the input signal of each sub-pixel. In this way, the output signal of each sub-pixel is determined by the input signals of all sub-pixels corresponding to the physical pixel units that are overlapped by the sampling region of the current sub-pixel and belong to the same view pixel unit as the sub-pixel. The exemplary embodiment of the present invention is capable of enhancing the resolution of the pixels in terms of visual effects, and enhancing resolution and improving display effects of the display device without increasing the size of the pixels. Meanwhile, the exemplary embodiment of the present invention is capable of combing the 3D display technology with the virtual algorithm in a better way to improve display effects of the display device.

Figure 13:
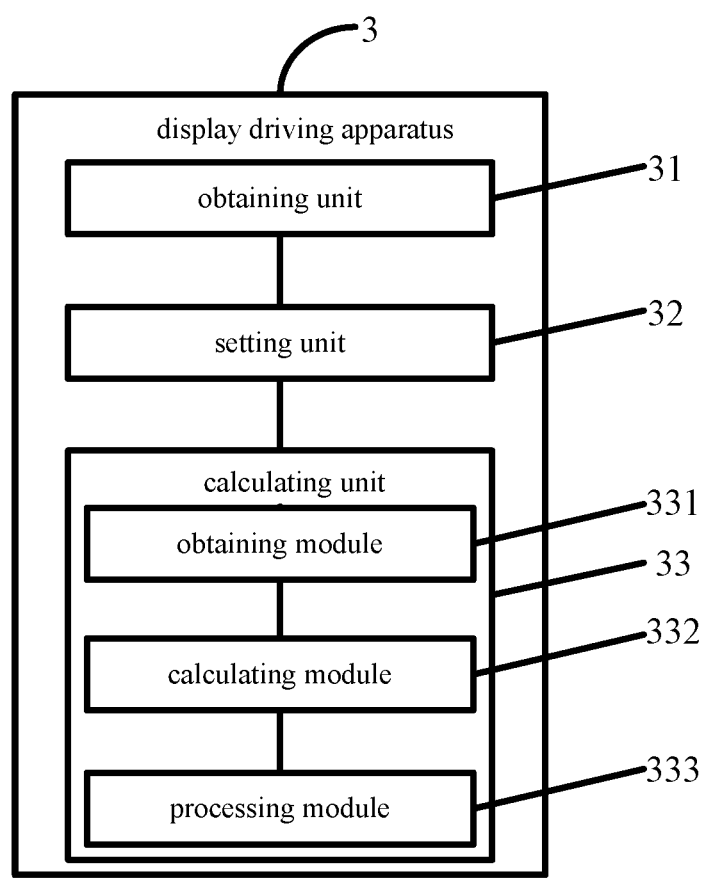
FIG. 13 is a schematic view illustrating the structure of a display driving apparatus according to another embodiment of the present invention.

In particular, as shown in FIG. 13, the calculating unit 33 may comprise an obtaining module 331, a calculating module 332 and a processing module 333, wherein the obtaining module 331 is used for obtaining, in the pixel array of the display device, a physical pixel unit overlapping the sampling region set by the setting unit 32 and belonging to the same view pixel unit as the sub-pixel;

the calculating module 332 is used for calculating the proportion of each physical pixel unit overlapping the sampling region and belonging to the same view pixel unit as the sub-pixel obtained by the obtaining module 331 to the sampling region; and the processing module 333 is used for calculating to obtain the output signal of each sub-pixel based on the input signal of the sub-pixel and the proportion of each physical pixel unit overlapping the sampling region and belonging to the same view pixel unit as the sub-pixel to the sampling region calculated by the calculating module 332.

Figure 14:
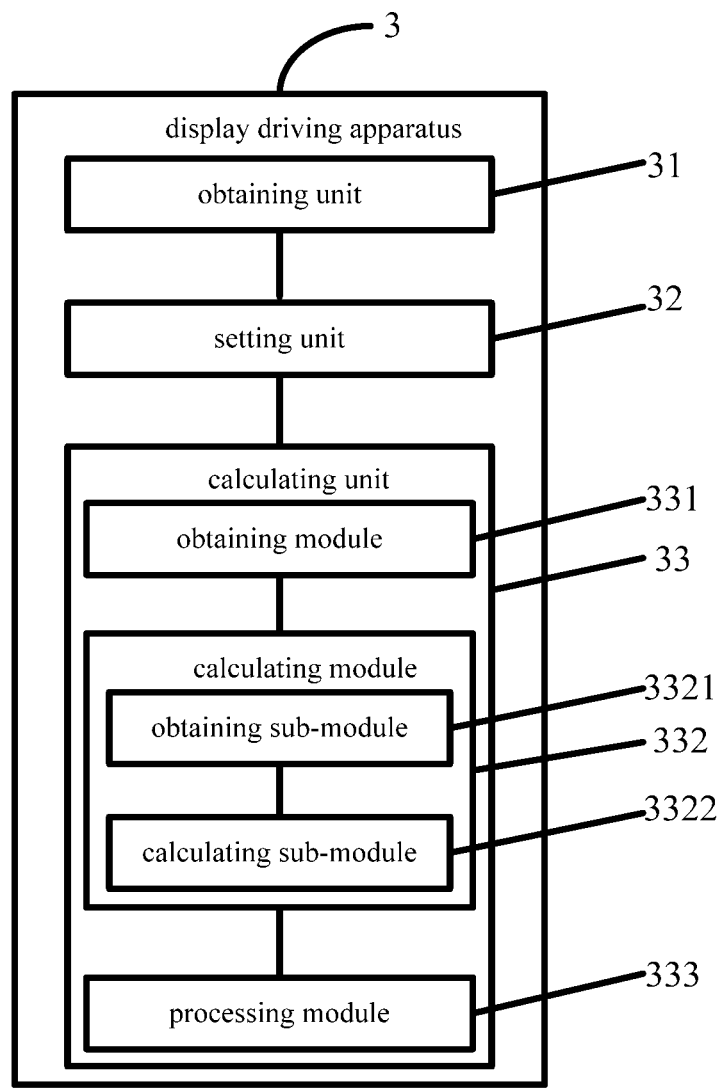
FIG. 14 is a schematic view illustrating the structure of a display driving apparatus according to still another embodiment of the present invention.

Furthermore, as shown in FIG. 14, the calculating module 332 may comprise an obtaining sub-module 3321 and a calculating sub-module 3322, wherein the obtaining sub-module 3321 is used for obtaining the area of the sampling region; and the calculating sub-module 3322 is used for calculating the overlapping area between each physical pixel unit overlapping the sampling region and belonging to the same view pixel unit as the sub-pixel and the sampling region.

The calculating sub-module 3322 is also used for calculating the proportion of each physical pixel unit overlapping the sampling region and belonging to the same view pixel unit as the sub-pixel to the sampling region based on the proportion of the overlapping area between each physical pixel unit overlapping the sampling region and belonging to the same view pixel unit as the sub-pixel and the sampling region to the area of the sampling region.

Furthermore, the processing module 333 may be operable to perform the following steps:

obtaining the value of an input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region; and calculating the value of the output signal of each sub-pixel based on the value of the input signal of each sub-pixel, which corresponds to the sampling region, of each physical pixel unit overlapping the sampling region and belonging to the same view pixel unit as the sub-pixel.

It should be understood that, in the sampling region corresponding to any of the sub-pixels, the boundaries of the sampling region of said sub-pixel on the side of an adjacent sub-pixel of the same kind are on an axis vertically and equally dividing a line connecting the center of said sub-pixel and the center of the adjacent sub-pixel of the same kind, and other boundaries of the sampling region are corresponding boundaries of the pixel region of the display device.

The sub-pixel of the same kind refers to a sub-pixel which belongs to the same kind of view pixel unit and has the same color as the sub-pixel. According to the exemplary embodiments of the present invention, the boundaries of all sampling regions of the sub-pixels of same kind are continuous.

According to one embodiment of the invention, the sampling region has a rectangular shape.

Those skilled in the art would appreciate that all or a part of the steps of the method in the foregoing embodiments may be implemented by hardware relevant to program instructions. The program may be stored in a computer readable storage medium. When the program runs, the steps of the foregoing method embodiments are performed. The storage medium may be any medium that is capable of storing program codes, such as a ROM, a RAM, a magnetic disk, or an optical disk.

The foregoing is only preferred embodiments of the present invention and is not intended to limit the present invention. All of any modifications, equivalent substitutions and improvements, which fall within the spirit and principles of the present invention, should be included in the scope of protection of the present invention. Therefore, the scope of the present invention should be subject to the scope of the claims sought for protection.

What is claimed is:

1. A display driving apparatus for pixel display of pixel units of a display device, the display device comprising a pixel array including a first view pixel unit and a second view pixel unit alternately arranged in a row direction, said pixel array including in each row sub-pixels corresponding to one color, each of the first and second view pixel units comprising a plurality of physical pixel units cyclically arranged in a column direction, and each physical pixel unit including a plurality of sub-pixels, the apparatus comprising:

an obtaining unit for obtaining an input signal of each sub-pixel in the first and second view pixel units;

a setting unit for setting a sampling region on the pixel array for each sub-pixel in the first and second view pixel units; and a calculating unit for determining an output signal of each sub-pixel based on the sampling region of each sub-pixel, the physical pixel unit overlapping the sampling region and belonging to the same view pixel unit as the sub-pixel, and the input signal of each sub-pixel.

2. The apparatus according to claim 1, further comprising the display device, the display device comprising a grating array which blocks a first side of the first view pixel unit and a second side of the second view pixel unit, wherein positions of the first side and the second side in the view pixel units are opposite.

3. The apparatus according to claim 1, wherein the setting unit is configured to set the sampling region on the pixel array for each sub-pixel in the first and second view pixel units by:

setting the sampling region on the pixel array for each sub-pixel of the physical pixel units, which are located on boundaries of the pixel array, of the first and second view pixel units.

4. The apparatus according to claim 3, wherein the calculating unit comprises:

an obtaining module for obtaining, in the pixel array of the display device, a physical pixel unit overlapping the sampling region and belonging to a same view pixel unit as the sub-pixel;

a calculating module for calculating a proportion of each physical pixel unit overlapping the sampling region and belonging to the same view pixel unit as the sub-pixel to the sampling region; and a processing module for obtaining the output signal of each sub-pixel based on the input signal of the sub-pixel and the proportion of each physical pixel unit overlapping the sampling region and belonging to the same view pixel unit as the sub-pixel to the sampling region.

5. The apparatus according to claim 4, wherein the calculating module comprises:

an obtaining sub-module for obtaining an area of the sampling region; and a calculating sub-module for calculating an overlapping area between each physical pixel unit overlapping the sampling region and belonging to the same view pixel unit as the sub-pixel and the sampling region;

wherein the calculating sub-module is configured to calculate the proportion of each physical pixel unit overlapping the sampling region and belonging to the same view pixel unit as the sub-pixel to the sampling region based on a proportion of the overlapping area between each physical pixel unit overlapping the sampling region and belonging to the same view pixel unit as the sub-pixel and the sampling region to the area of the sampling region.

6. The apparatus according to claim 4, wherein the processing module is configured to:

obtain a value of the input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region; and calculate a value of the output signal of each sub-pixel based on the value of the input signal of each sub-pixel, which corresponds to the sampling region, of each physical pixel unit overlapping the sampling region and belonging to the same view pixel unit as the sub-pixel.

7. The apparatus according to claim 1, wherein:

in the sampling region corresponding to any of the sub-pixels, boundaries of the sampling region of said sub-pixel on a side of an adjacent sub-pixel of a same kind are on an axis vertically and equally dividing a line connecting a center of said sub-pixel and a center of the adjacent sub-pixel of the same kind;

other boundaries of the sampling region are boundaries of a pixel region of the display device; and the sub-pixel of the same kind is a sub-pixel which belongs to a same kind of view pixel unit and has a same color as the sub-pixel.

8. The apparatus according to claim 7, wherein the sampling region has a rectangular shape.

9. A display driving method for pixel display of pixel units of a display device, the display device comprising a pixel array including a first view pixel unit and a second view pixel unit alternately arranged in a row direction, said pixel array including in each row sub-pixels corresponding to one color, each of the first and second view pixel units comprising a plurality of physical pixel units cyclically arranged in a column direction, and each physical pixel unit including a plurality of sub-pixels, the method comprising:

obtaining an input signal of each sub-pixel in each physical pixel unit of the first and second view pixel units;

setting a sampling region on the pixel array for each sub-pixel in the first and second view pixel units; and determining an output signal of each sub-pixel based on the sampling region of each sub-pixel, the physical pixel unit overlapping the sampling region and belonging to the same view pixel unit as the sub-pixel, and the input signal of each sub-pixel.

10. The method according to claim 9, wherein the display device further comprises a grating array, which blocks a first side of the first view pixel unit and a second side of the second view pixel unit, and positions of the first side and the second side in the view pixel units are opposite.

11. The method according to claim 9, wherein setting the sampling region on the pixel array for each sub-pixel in the first and second view pixel units comprises:

setting the sampling region on the pixel array for each sub-pixel of the physical pixel units, which are located on boundaries of the pixel array, of the first and second view pixel units.

12. The method according to claim 11, wherein determining the output signal of each sub-pixel based on the sampling region of each sub-pixel, the physical pixel unit overlapping the sampling region and belonging to the same view pixel unit as the sub-pixel, and the input signal of each sub-pixel comprises:

in the pixel array of the display device, obtaining a physical pixel unit overlapping the sampling region and belonging to a same view pixel unit as the sub-pixel;

calculating a proportion of each physical pixel unit overlapping the sampling region and belonging to the same view pixel unit as the sub-pixel to the sampling region; and calculating to obtain the output signal of each sub-pixel based on the input signal of the sub-pixel and the proportion of each physical pixel unit overlapping the sampling region and belonging to the same view pixel unit as the sub-pixel to the sampling region.

13. The method according to claim 12, wherein calculating the proportion of each physical pixel unit overlapping the sampling region and belonging to the same view pixel unit as the sub-pixel to the sampling region comprises:

obtaining an area of the sampling region;

calculating an overlapping area between each physical pixel unit overlapping the sampling region and belonging to the same view pixel unit as the sub-pixel and the sampling region; and calculating the proportion of each physical pixel unit overlapping the sampling region and belonging to the same view pixel unit as the sub-pixel to the sampling region based on a proportion of the overlapping area between each physical pixel unit overlapping the sampling region and belonging to the same view pixel unit as the sub-pixel and the sampling region to the total area of the sampling region.

14. The method according to claim 13, wherein calculating to obtain the output signal of each sub-pixel based on the input signal of the sub-pixel and the proportion of each physical pixel unit overlapping the sampling region and belonging to the same view pixel unit as the sub-pixel to the sampling region comprises:

obtaining a value of the input signal of each sub-pixel, which corresponds to the sampling region, of each physical pixel unit overlapping the sampling region and belonging to the same view pixel unit as the sub-pixel based on the input signal of the sub-pixel and the proportion of each physical pixel unit overlapping the sampling region and belonging to the same view pixel unit as the sub-pixel to the sampling region; and calculating the value of the output signal of each sub-pixel based on the value of the input signal of each sub-pixel, which corresponds to the sampling region, of each physical pixel unit overlapping the sampling region and belonging to the same view pixel unit as the sub-pixel.

15. The method according to claim 9, wherein in the sampling region corresponding to any of the sub-pixels, boundaries of the sampling region of said sub-pixel on a side of an adjacent sub-pixel of a same kind are on an axis vertically and equally dividing a line connecting a center of said sub-pixel and a center of the adjacent sub-pixel of the same kind;

other boundaries of the sampling region are boundaries of a pixel region of the display device; and the sub-pixel of the same kind is a sub-pixel which belongs to a same kind of view pixel unit and has a same color as the sub-pixel.

16. The method according to claim 15, wherein the sampling region has a rectangular shape.

* * * * *

UNITED STATES PATENT AND TRADEMARK OFFICE
CERTIFICATE OF CORRECTION

| | | |
|---|---|---|
| PATENT NO. | : 10,194,142 B2 | Page 1 of 2 |
| APPLICATION NO. | : 15/023268 | |
| DATED | : January 29, 2019 | |
| INVENTOR(S) | : Renwei Guo et al. | |

It is certified that error appears in the above-identified patent and that said Letters Patent is hereby corrected as shown below:

In the Drawings

Sheet 2 of 9, replace Figure 2 with the attached Figure 2.

Signed and Sealed this
First Day of October, 2019

Andrei Iancu
*Director of the United States Patent and Trademark Office*

|    | S1  | S2  | S3  | S4  | S5  | S6  | S7  | S8  |
|----|-----|-----|-----|-----|-----|-----|-----|-----|
| R1 | B1  | B2  | B1  | B2  | B1  | B2  | B1  | B2  |
| R2 | G1  | G2  | G1  | G2  | G1  | G2  | G1  | G2  |
| R3 | R1  | R2  | R1  | R2  | R1  | R2  | R1  | R2  |
| R4 | B1  | B2  | B1  | B2  | B1  | B2  | B1  | B2  |
| R5 | G1  | G2  | G1  | G2  | G1  | G2  | G1  | G2  |
| R6 | R1  | R2  | R1  | R2  | R1  | R2  | R1  | R2  |
| R7 | B1  | B2  | B1  | B2  | B1  | B2  | B1  | B2  |
| R8 | G1  | G2  | G1  | G2  | G1  | G2  | G1  | G2  |
| R9 | R1  | R2  | R1  | R2  | R1  | R2  | R1  | R2  |
| R10| B1  | B2  | B1  | B2  | B1  | B2  | B1  | B2  |
| R11| G1  | G2  | G1  | G2  | G1  | G2  | G1  | G2  |
| R12| R1  | R2  | R1  | R2  | R1  | R2  | R1  | R2  |
| R13| B1  | B2  | B1  | B2  | B1  | B2  | B1  | B2  |
| R14| G1  | G2  | G1  | G2  | G1  | G2  | G1  | G2  |
| R15| R1  | R2  | R1  | R2  | R1  | R2  | R1  | R2  |
| R16| B1  | B2  | B1  | B2  | B1  | B2  | B1  | B2  |
| R17| G1  | G2  | G1  | G2  | G1  | G2  | G1  | G2  |
| R18| R1  | R2  | R1  | R2  | R1  | R2  | R1  | R2  |

10  11

FIG. 2